Patented Sept. 8, 1936

2,053,430

UNITED STATES PATENT OFFICE 2,053,430

HYDROGENATION OF AROYL AROMATIC ACIDS AND THEIR DERIVATIVES

George Dewitt Graves, Wilmington, Del., assignor to E. I. du Pont de Nemours & Company, Wilmington, Del., a corporation of Delaware No Drawing. Application March 21, 1935, Serial No. 12,329

13 Claims. (Cl. 260—64)

This invention relates to the catalytic hydrogenation of aroyl aromatic acids to the corresponding lactones and aryl methyl aromatic acids. Specifically, the invention relates to the catalytic hydrogenation of a benzyl benzoic acid to a phenyl phthalide and the corresponding benzyl benzoic acid.

Benzoyl benzoic acid has in the past been reduced with sodium amalgam to form the products of the present invention.

This invention has as an object the production of phenyl phthalide and benzyl benzoic acid by means of the catalytic hydrogenation of benzoyl benzoic acid. A further object is the catalytic hydrogenation of derivatives of benzoyl benzoic acid to produce the corresponding benzyl benzoic acid derivatives. A still further object is to effect these hydrogenations by the employment of highly efficient base metal catalysts. Other objects will appear hereinafter.

These objects are accomplished by the following invention which in a general way comprises the treatment of benzoyl benzoic acid or its derivatives with hydrogen at elevated pressures and temperatures in the presence of highly efficient base metal catalysts.

The following examples which are descriptive of the invention, set forth preferred embodiments of the processes of the invention. These examples are presented as illustrations and are not to be considered as limiting the invention.

Example 1

One hundred and thirteen grams of ortho-benzoyl benzoic acid was dissolved in a solution of 20 g. of sodium hydroxide in 150 g. of water. The resulting solution of sodium benzoyl benzoate together with 13 g. of nickel-on-kieselguhr catalyst was charged into a shaking autoclave and agitated for one hour at 90–100° C. and a hydrogen pressure of 1500 lbs. per sq. in. The solution was filtered to remove the catalyst and then poured into concentrated hydrochloric acid solution. The ortho-benzyl benzoic acid which precipitated was filtered off and further purified by crystallization from benzene. The yield of ortho-benzyl benzoic acid amounted to 94% of theory (100 g.). The melting point of the product was 115° C.

Example 2

One hundred seventy grams of ortho-benzoyl benzoic acid, 100 cc. of cyclohexane, and 10 g. of nickel-on-kieselguhr catalyst were placed in a shaking autoclave and agitated at 185–200° C. and 2000 lbs. per sq. in. hydrogen pressure for 1.5 hours. The catalyst was filtered off and the solvent evaporated. The reaction products were dissolved in aqueous sodium hydroxide and the iron hydroxide which formed was removed by filtration. Addition of sulfuric acid precipitated an oil which solidified. From this oil, 26 g. of ortho-benzyl benzoic acid was separated by recrystallization from benzene (or petroleum ether), in which phenyl phthalide is very soluble. By recrystallization from methyl alcohol, there was obtained 10 g. of phenyl phthalide. Both products melted at 115° C. A mixed melting point of 93° C. was observed.

After removing the catalyst from the reaction products and evaporating the solvent, as described above, an alternative method of separation of the products is as follows:

The ortho-benzylbenzoic acid is dissolved in sodium carbonate solution, in which phenyl phthalide is insoluble. The ortho-benzylbenzoic acid is reprecipitated with hydrochloric acid and recovered as described in Example 1. The phenyl phthalide is purified by crystallization from methyl alcohol.

Example 3

A solution of the sodium salt of ortho-benzoyl benzoic acid was prepared by dissolving 226 g. of benzoyl benzoic acid in a solution of 41 g. of sodium hydroxide in 200 g. of water. Four hundred grams of the resulting solution, which was slightly acid to litmus, together with 25 g. of nickel-on-kieselguhr catalyst was charged into a shaking autoclave and agitated for 4 hours at a temperature of 200° C. and a hydrogen pressure of 2000 lbs. per sq. in. Fifty grams of benzylbenzoic acid was recovered from the reaction products, as described in Example 1.

In another run, an aqueous solution containing 133 g. of sodium benzoyl benzoate was hydrogenated at 100° C. and 2000 lbs. per sq. in. pressure with a resulting yield of 70 g. of ortho-benzyl benzoic acid.

The processes of this invention are applicable to such ketonic structures as are found in the aroyl aromatic carboxylic acids. Such acids are conveniently prepared by the condensation of phthalic anhydride or its nuclear substitution products with an aromatic compound or its nuclear substitution products. Typical acids which belong to the general glass, the hydrogenations of which are contemplated under the present invention, are Benzoyl-o-benzoic acid
P-toluyl-o-benzoic acid
Alpha-naphthoyl-o-benzoic acid
P-phenyl benzoyl-o-benzoic acid
Alpha-hydroxy naphthoyl-o-benzoic acid
P-cymoyl-o-benzoic acid
Methoxy benzoyl-o-benzoic acid
P-hydroxyl benzoyl-o-benzoic acid.

The above mentioned acids may be hydrogenated as such or in the form of their salts, esters, or anhydrides. The salts, for example, may be sodium or potassium ortho-benzoyl benzoate or other water soluble salts. The esters may be alkyl or aryl esters such as ethyl, methyl, phenyl, etc.

Base metal hydrogenating catalysts are suitable for the processes of this invention, and include iron, copper, nickel, cobalt, tin, etc. The base metal catalysts may be used in the elementary state or in the oxide form, and may be promoted by difficultly reducible oxides of metals such as chromium, vanadium, molybdenum, etc. For example, such as catalyst is nickel combined with chromium oxide, commonly termed nickel chromite. When using metal catalysts it is preferable that they be supported on inert materials such as kieselguhr, pumice, silica gel, etc. A preferred nickel catalyst is prepared by digesting a nickel-aluminum alloy with sodium hydroxide according to the Raney method as described in U. S. Patent 1,628,190. Another preferred catalyst consists of freshly reduced, kieselguhr-supported nickel, protected from exposure to the air.

The preferred temperature range for the processes of the invention is from about 75° C. to 250° C., but a wider range of temperature may be used, say from 30° C. to 300° C.

Preferred pressures for this invention range from 1000 to 3000 lbs. per sq. in. although a wider range of pressures is operable, say from 500 lbs. per sq. in. to an upper limit determined only by the strength of the reaction vessel.

If phenyl phthalide is the desired hydrogenation product, it will be found that its formation is favored when ortho-benzoyl benzoic acid or its salts or esters are hydrogenated over nickel-on-kieselguhr catalyst in the presence of a solvent such as ethyl alcohol, cyclohexane, etc. As phenyl phthalide is an intermediate product in the formation of ortho-benzylbenzoic acid, it will be apparent that phenyl phthalide may be hydrogenated to the final product if desired. Water solutions of ortho-benzoyl benzoic acid or its salts hydrogenate almost quantitatively to ortho-benzylbenzoic acid in the presence of a nickel-on-kieselguhr catalyst. The hydrogenation may be carried still further to obtain ortho-hexahydrobenzylhexahydrobenzoic acid.

Although the use of solvents as mentioned above, is preferable, hydrogenation may be effected in the absence of solvents.

The present invention provides a new, practical, and economical method for obtaining benzyl benzoic acid and phenyl phthalide from benzoyl benzoic acid. The products of our invention may be used as dyestuffs and drug intermediates, softening and modifying agents for plastics and other compositions, and will also serve as starting points for further syntheses.

As many apparently widely different embodiments of this invention may be made without departing from the spirit and scope thereof, it is to be understood that I do not limit myself to the specific embodiments thereof except as defined in the appended patent claims.

I claim:

1. A process for the catalytic hydrogenation of the ketonic structures of aroyl aromatic carboxylic acids which comprises bringing hydrogen into contact with a compound containing the radical of an aroyl aromatic carboxylic acid in which the carboxyl group is ortho to the keto group, said compound selected from the group consisting of aroyl aromatic carboxylic acids, their esters, their salts and their anhydrides, at a temperature within the range of 30° to 300° C. and at a pressure of at least 500 pounds per square inch in the presence of a base metal hydrogenating catalyst.

2. The process in accordance with claim 1, characterized in that the temperature is within the range of 75° to 250° C.

3. The process in accordance with claim 1, characterized in that the pressure is within the range of 1000 to 3000 pounds per square inch.

4. The process in accordance with claim 1, characterized in that the catalyst is a base metal hydrogenating catalyst promoted by a difficultly reducible metal oxide.

5. The process in accordance with claim 1, characterized in that the catalyst is a nickel catalyst.

6. The process in accordance with claim 1, characterized in that the catalyst is a nickel catalyst associated with chromium sesqui-oxide.

7. The process in accordance with claim 1, characterized in that the catalyst is supported on an inert porous material.

8. The process in accordance with claim 1, characterized in that the catalyst comprises essentially nickel supported on kieselguhr.

9. The process in accordance with claim 1, characterized in that the reaction is carried out in the presence of an organic solvent.

10. The process in accordance with claim 1, characterized in that the reaction is carried out in the presence of cyclohexane.

11. A process for the catalytic hydrogenation of the ketonic structures of aroyl aromatic carboxylic acids which comprises bringing a cyclohexane solution of an orthobenzoyl benzoic acid into contact with hydrogen in the presence of a nickel catalyst at a temperature within the range of 75° to 250° C. and a pressure between 1000 and 3000 pounds per square inch.

12. A process for the catalytic hydrogenation of the ketonic structures of aroyl aromatic carboxylic acids which comprises bringing an aqueous solution of sodium ortho benzoyl benzoate into contact with hydrogen in the presence of a nickel catalyst at a temperature within the range of 75° to 250° C. and at a pressure between 1000 and 3000 pounds per square inch.

13. A process for the catalytic hydrogenation of the ketonic structures of aroyl aromatic carboxylic acids which comprises dissolving ortho-benzoyl benzoic acid in an aqueous solution of sodium hydroxide, adding thereto a catalyst comprising essentially nickel supported on kieselguhr and shaking said mixture in an atmosphere of hydrogen at a temperature of about 90° to 100° C. and under a pressure of about 1500 pounds per square inch for about one hour, then removing the catalyst, pouring the resulting solution into concentrated sulfuric acid, and recovering orthobenzyl benzoic acid as a precipitate.

GEORGE DEWITT GRAVES.